(12) United States Patent
Dogru et al.

(10) Patent No.: US 12,005,521 B2
(45) Date of Patent: Jun. 11, 2024

(54) METHOD FOR 3D LASER PRINTING BY HEATING/FUSING METAL WIRE OR POWDER MATERIAL WITH CONTROLLABLE MELT POOL

(71) Applicants: John Mehmet Ulgar Dogru, Dallas, TX (US); Anton Vedeshin, Tallinn (EE)

(72) Inventors: John Mehmet Ulgar Dogru, Dallas, TX (US); Anton Vedeshin, Tallinn (EE)

( * ) Notice: Subject to any disclaimer, the term of this patent is extended or adjusted under 35 U.S.C. 154(b) by 0 days.

(21) Appl. No.: 18/238,800

(22) Filed: Aug. 28, 2023

(65) Prior Publication Data
US 2023/0405722 A1   Dec. 21, 2023

Related U.S. Application Data

(62) Division of application No. 16/820,515, filed on Mar. 16, 2020, now Pat. No. 11,826,854.

(51) Int. Cl.
*B23K 26/354* (2014.01)
*B23K 26/035* (2014.01)
(Continued)

(52) U.S. Cl.
CPC .......... *B23K 26/354* (2015.10); *B23K 26/035* (2015.10); *B23K 26/0648* (2013.01);
(Continued)

(58) Field of Classification Search
CPC ......... B33Y 30/00; B33Y 10/00; B33Y 50/02; B33Y 70/00; B33Y 80/00; B33Y 40/00;
(Continued)

(56) References Cited

U.S. PATENT DOCUMENTS

| 6,269,540 B1 * | 8/2001 | Islam | B23K 26/0608 |
| | | | 29/889.7 |
| 6,504,127 B1 * | 1/2003 | McGregor | B33Y 30/00 |
| | | | 219/121.64 |

(Continued)

OTHER PUBLICATIONS

N. Calta, et al. "High Speed Thermal Imaging of the Melt Pool during Laser Powder Bed Fusion of Metal Alloys" at the 2017 Annual International Solid Freeform Fabrication Symposium.
(Continued)

*Primary Examiner* — Chris Q Liu

(57) ABSTRACT

A method for fusing a metal material with control of a melt pool on a substrate is provided. The method consists of providing a plurality of laser sources arranged on an imaginary hemispheric surface, wherein each laser source contains a laser tiltable relative to the longitudinal axis of the laser source housing and/or displaceable in the direction of the longitudinal axis of the housing. The optical axes of the lasers are inclined to the material feed direction toward a substrate. The optical axes of the inclined lasers intersect the material feed direction. The material is fed toward a substrate which is placed on a table that has at least three degrees of freedom for moving the substrate in a space relative to the focal points of the laser beams to impart to the object being printed a desired 3D configuration.

7 Claims, 6 Drawing Sheets

(51) Int. Cl.
*B23K 26/06* (2014.01)
*B23K 26/08* (2014.01)
*B23K 26/342* (2014.01)
*B33Y 10/00* (2015.01)
*B33Y 30/00* (2015.01)

(52) U.S. Cl.
CPC ........ *B23K 26/0876* (2013.01); *B23K 26/342* (2015.10); *B33Y 10/00* (2014.12); *B33Y 30/00* (2014.12)

(58) Field of Classification Search
CPC ......... B33Y 50/00; B33Y 40/20; B33Y 70/10; B23K 26/342; B23K 26/082; B23K 26/0608; B23K 26/0604; B23K 26/032; B23K 26/144; B23K 26/34; B23K 26/0876; B23K 26/0626; B23K 26/127; B23K 26/0006; B23K 26/034; B23K 26/0648; B23K 26/0676; B23K 2103/26; B23K 2103/50; B23K 26/0643; B23K 26/067; B23K 26/32; B23K 35/0244; B23K 2101/001; B23K 2103/36; B23K 26/0093; B23K 26/02; B23K 26/0342; B23K 26/04; B23K 26/042; B23K 26/044; B23K 26/064; B23K 26/0652; B23K 26/0665; B23K 26/073; B23K 26/08; B23K 26/0821; B23K 26/0861; B23K 26/0884; B23K 26/125; B23K 26/14; B23K 26/1464; B23K 26/147; B23K 26/1476; B23K 26/703; B23K 35/0255; B23K 15/0086; B23K 2103/04; B23K 2103/08; B23K 2103/30; B23K 26/03; B23K 26/035; B23K 26/046; B23K 26/06; B23K 26/0622; B23K 26/083; B23K 26/0869; B23K 26/123; B23K 26/146; B23K 26/21; B23K 26/324; B23K 26/354; B23K 26/36; B23K 26/707; B23K 35/0261; B23K 35/228; B23K 35/24; B23K 35/3033; B23K 35/3046; B23K 37/0235
USPC ............. 219/76.12, 121.64, 121.61, 121.84, 219/121.62, 121.63, 121.65, 121.66, 219/121.78, 76.1
See application file for complete search history.

(56) References Cited

U.S. PATENT DOCUMENTS

| | | | |
|---|---|---|---|
| 2009/0230099 A1* | 9/2009 | Aalto | B23K 35/0261 219/121.61 |
| 2014/0263195 A1* | 9/2014 | Shuck | B23K 15/0086 219/76.14 |
| 2016/0023304 A1* | 1/2016 | Bruck | B23K 26/3584 219/121.61 |
| 2016/0067827 A1* | 3/2016 | Zediker | B23K 26/144 219/76.12 |
| 2016/0151859 A1* | 6/2016 | Sparks | B22F 10/22 219/76.12 |
| 2016/0318129 A1* | 11/2016 | Hu | B29C 64/182 |
| 2018/0117851 A1* | 5/2018 | Reese | B29C 64/209 |
| 2019/0118481 A1* | 4/2019 | Brown | B29C 64/393 |
| 2019/0366480 A1* | 12/2019 | Kotliar | B23K 26/08 |

OTHER PUBLICATIONS

Jarred Helgel, et al. from National Institute of Standards and Technology on Aug. 9, 2017 at Proceedings of the Solid Freeform Fabrication Symposium.
Abstract of the article entitled "Selective laser melting of Al—8.5Fe—1.3V—1.7Si alloy: Investigation on the resultant microstructure and hardness" by Zheng Lijing, et al.
Article by Yu-CheWu, et al. in Journal of Materials Processing Technology, vol. 254, Apr. 2018, pp. 72-78.
Thermal behavior and geometry model of melt pool in laser material process are described by Lijun Han, et al. in Journal of Heat Transfer, vol. 127, Issue 9, pp. 1005-1014, Sep. 2005.

* cited by examiner

METHOD FOR 3D LASER PRINTING BY HEATING/FUSING METAL WIRE OR POWDER MATERIAL WITH CONTROLLABLE MELT POOL

CROSS-REFERENCES TO RELATED APPLICATIONS

This is a divisional of U.S. patent application Ser. No. 16/820,515 filed on Mar. 16, 2020. Notice of Allowance for this application was issued on Jul. 26, 2023.

FIELD OF THE INVENTION

The present invention relates to laser printing, more particularly to 3D laser printing, and specifically to a method for 3D laser printing by fusing a metal wire or powder material with controllable melt pool. The invention may find use in additive manufacturing for the production of various models having intricate shapes the production of which by conventional manufacturing methods requires the use of a complicated and expensive equipment that involves multiple manufacturing steps, etc. The invention may also find use in creation of souvenir products, design of jewelry and interior items, creation of architectural models, creation of spare parts and technical structures, creation of trial packaging designs, and the like.

DESCRIPTION OF THE PRIOR ART

In spite of the fact that 3D laser printing is a rather recent technology, nowadays there exist already a great variety of various apparatuses and methods for employing this technology in the industry. The 3D printing technique can be realized by fusing and layering various materials in a liquid, powdered, and metal wire forms.

Description of 3D laser printing apparatuses and methods may be found in multiple patent and non-patent publications. Examples of some patent publications, including those that describe control of a melt pool, are given below.

US Patent Application Publication No. 20160151859A1 Published on Jan. 2, 2016 (Inventor: T. Sparks) discloses a system and method for controlling the input energy from an energy point source during metal processing, wherein the input energy from an energy point source that directs focused emitted energy onto a metal workpiece creates a melt pool and hot zone on the workpiece that emit radiation during the process. The method comprises determining a wavelength range for the emitted radiation that is within a spectral range of radiation emitted by the hot zone during processing that is comparatively high in amount in relation to the amount of radiation emitted by the melt pool in that spectral range during processing. The method involves the steps of measuring the intensity of radiation within the determined wavelength range and adjusting the input energy from the energy point source based upon the measured intensity of radiation within the determined wavelength range.

US Patent Application Publication No. 20140263195A1 published on Sep. 18, 2014 (Inventor: Q. Shuck) discloses a method of forming a build layer of metal on a surface of an article by using 3D printing. A laser deposition head including a light source and a nozzle is positioned relative to the surface of the article by a distance that is about normal to the surface. The surface of the article is melted locally using the laser light source to form a melt pool. Powdered metal is injected into the melt pool using the nozzle. The melt pool is solidified to form the build layer having a desired microstructure on the surface of the article. The method further comprises determining a second distance between the laser deposition head and a second area of the surface of the article to cause a second melt pool having the first melt-pool cooling rate. The laser deposition head is moved relative to the article to establish the second distance and to melt the second area using the light source of the laser deposition head to establish the second melt pool. The powdered metal is injected into the first area at a second flow rate using a nozzle, and the second melt pool is solidified. The second flow rate may be equal to the first flow rate, or may be different from the first one.

US Patent Application Publication No. 20160023304A1 Published on Jan. 28, 2016 (Inventors: G. Bruck, et al.) discloses a method for forming three-dimensional anchoring structures on a surface. The method includes: forming a melt pool on a solid surface; applying an energy be to melt the solid material adjacent the melt pool; and controlling the energy beam such that the melting of the solid material adjacent the melt pool creates a wave front in the melt pool effective to form a protrusion of material upon solidification. The method further includes forming an annular shaped melt pool around the solid material.

Known in the art also are multiple scientific studies aimed at the investigation of processes and conversions that take place in a melt pool during 3D laser printing.

For example, in a report by N. Calta, et al. "High Speed Thermal Imaging of the Melt Pool during Laser Powder Bed Fusion of Metal Alloys" at the 2017 Annual International Solid Freeform Fabrication Symposium, it is stated that a temperature distribution, peak temperatures, and cooling rates in and around the melt pool during a laser powder bed fusion build have profound effects on final microstructure and defect formation. Despite their importance to process modelling, these parameters remain poorly understood due to the high spatial and time resolution required to probe them on length and time scales relevant to melt pool fluctuations. The authors present 20 kHz thermal imaging of the melt pool viewed coaxially to the beam using a two-color thermographic approach. Presented are trends in the thermal profile, such as peak temperature and thermal gradient around the melt pool, as a function of laser scanning parameters. The experimental results are discussed in the context of melt pool-scale models.

The effect of a powder on cooling rate and melt pool length measurements using in situ thermographic techniques was reported by Jarred Heigel, et al. from National Institute of Standards and Technology on Aug. 9, 2017 at Proceedings of the Solid Freeform Fabrication Symposium. High-speed thermal cameras enabled in situ measurement of the temperatures in and around melt pools generated during powder bed fusion processes. From these measurements, the melt pool length and cooling rates of the solidifying material were calculated and used to monitor the process and to validate thermal models. The objective of this work was to present high-speed (1800 frames per second) thermographic measurements of single and multiple line scans on plates with and without powder layers using a variety of processing conditions and to discuss the impacts of powder on the measurement.

An Abstract of the article entitled "Selective laser melting of Al-8.5Fe-1.3V-1.7Si alloy: Investigation on the resultant microstructure and hardness" by Zheng Lijing, et al. available in *Chinese Journal of Aeronautics* 20(2) • February 2015, presents a microstructure and hardness variation of an Al-8.5Fe-1.3V-1.7Si (wt %, FVS0812) alloy after selective laser melting (SLM) modification. Three zones were distinguished across the melting pool of the SLM-processed FVS0812 alloy: the laser melted zone (LMZ), the melting pool border, and the heat affected zone (HAZ) in the previously deposited area around the melting pool. Inside the LMZ, either an extremely fine cellular-dendritic structure or a mixture zone of the α-Al matrix and nanoscale $Al_{12}(Fe,V)_3Si$ particles appeared. With a decreased laser beam scanning speed, the cellular-dendritic structure zone within the LMZ shrank significantly while the mixture zone expanded. The α-Al and $Al_{12}(Fe,V)_3Si$ mixture zone was also observed in the HAZ, but another phase, submicron $θ-Al_{13}Fe_4$ particles with rectangular or hexagonal shapes, formed along the melting pool border. Microhardness tests indicated that the hardness of the SLM-processed FVS0812 samples far exceeded that of the as-cast FVS0812 alloy.

An article by Yu-CheWu, et al. in Journal of Materials Processing Technology, *Volume* 254, April 2018, Pages 72-78, discloses a numerical modeling of melt-pool behavior in selective laser melting with random powder distribution and experimental validation. Simulation of a selective 3D laser melting process is developed to investigate the melt-pool behavior of a randomly-distributed powder bed with keyhole formation by Nd-YAG laser. In order to simulate a randomly packed powder bed, the discrete element method is introduced to ensure a close match with real conditions. Also, to show the importance of evaporation during laser melting, the melt pool temperature, melt pool dimensions and the surface morphology are used as metrics for comparison. Numerical results show that the keyhole was formed as evaporation occurred, and the shape of the melt pool was narrow and deep, which implied the main direction of heat transfer had changed to being vertical. Through simulation, the transition from keyhole formation to the final convex surface at a local area was discovered. The simulation results are validated via good agreement with the experiment.

Thermal behavior and geometry model of melt pool in laser material process are described by Lijun Han, et al. In Journal of Heat Transfer, Volume 127, Issue 9, pp. 1005-1014, September 2005. It is stated that melt pool geometry and thermal behavior control are essential in obtaining consistent building performances, such as geometrical accuracy, microstructure, and residual stress. In the work, a three dimensional model is developed to predict the thermal behavior and geometry of the melt pool in the laser material interaction process. The evolution of the melt pool and effects of the process parameters are investigated through the simulations with stationary and moving laser beam cases. The roles of the convection and surface deformation on the heat dissipation and melt pool geometry are revealed by dimensionless analysis. The melt pool shape and fluid flow are considerably affected by interfacial forces such as thermocapillary force, surface tension, and recoil vapor pressure. Quantitative comparison of interfacial forces indicates that recoil vapor pressure is dominant under the melt pool center while thermocapillary force and surface tension are more important at the periphery of the melt pool. For verification purposes, the complementary metal oxide semiconductor camera has been utilized to acquire the melt pool image online and the melt pool geometries are measured by cross sectioning the samples obtained at various process conditions. Comparison of the experimental data and model prediction shows a good agreement.

There exist many other similar articles, but a common feature of all known patent publications and technical articles is that they consider formation and behavior of the melt pull created by a laser beam directed essentially perpendicular to the surface of an article for melting mainly a powdered material.

The inventors herein developed an apparatus and method for 3D laser printing by fusing a metal wire material, which is disclosed in pending U.S. patent application Ser. No. 16/739,874 filed on Jan. 10, 2020. The apparatus and method are characterized in that the zone of fusion is heated and fused not by a single beam but rather by a plurality of laser beams uniformly converged into the focal area around the tip of the wire material. This feature provides uniform distribution of heat and symmetry in the structure of the formed object and is achieved by using a plurality of laser sources that emit beams into collimators, which produce collimated beams that are converged by a focusing optical lens into a focal point on an object-formation table. The optical and wire feeding units are stationary, while the object-formation table is moveable under command of a computer along a pre-programmed spatial trajectory.

SUMMARY OF THE INVENTION

The invention relates to a method for 3D laser printing by heating/fusing metal wire or powder material with controllable melt pool. The method is based on the use of an apparatus for 3D laser printing for fusing a metal material with control of a melt pool formed on a substrate, wherein the apparatus has a metal material feed unit, a plurality of laser sources, which are arranged symmetrically on an imaginary hemispherical surface and emit the laser beams intersecting the axis of the material feed; and an object-formation table that supports a substrate on which a 3D laser printing object of a predetermined shape is formed and which possesses at least three degrees of freedom for motions relative to the material feed axis. Each laser source contains a laser, and a beam generated by the respective laser has a focal point that can be positioned at different points on the optical axis. Each laser beam can be tilted with respect to the longitudinal axis of the laser source. In the method, the melt temperature and printing conditions are controlled by adjusting the angle of tiling of the laser beam in combination with the displacement of the focal point of the beam in the material feed direction. The metal material is treated by fusing or heating the material at a selected point based on the type of the metal material. The object acquires a predetermined shape by spatially moving the object-formation table in a space relative to the hemispherical surface.

DETAILED DESCRIPTION OF THE INVENTION

The present invention relates to laser printing, more particularly to 3D laser printing, and specifically to a method for 3D laser printing by fusing a metal wire material with controllable melt pool. The invention may find use in additive manufacturing for the production of various models having intricate shapes the production of which by conventional manufacturing methods requires the use of a complicated and expensive equipment that involves multiple manufacturing steps, etc. The invention may also find use in the manufacture of souvenir products, design of jewelry and interior items, creation of architectural models, creation of spare parts and technical structures, and the like.

The method of the invention will be described below in more detail with reference to specific drawings that illustrate modifications according to various aspects of the invention.

For better understanding the method of the invention, it would be advantageous to consider a 3D printing apparatus suitable for carrying out the invention. This apparatus is a subject of a separate invention, which is described in U.S. patent application Ser. No. 16/820,515. filed on Mar. 16, 2020. The present patent application is a divisional prom the aforementioned earlier patent application.

Figure 1:
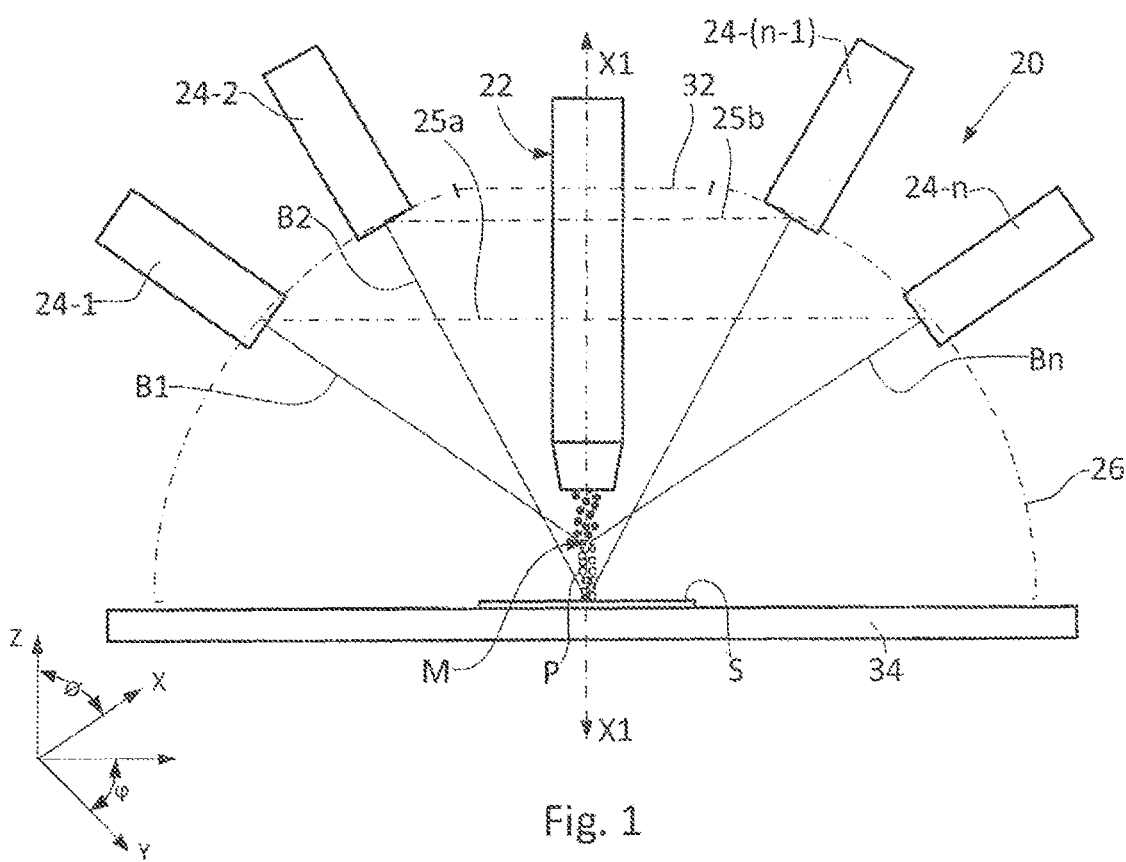
FIG. 1 is a schematic general sectional view of an apparatus of the invention for 3D laser printing method of the invention by fusing a metal material with control of a melt pool formed on a substrate.
Figure 5:
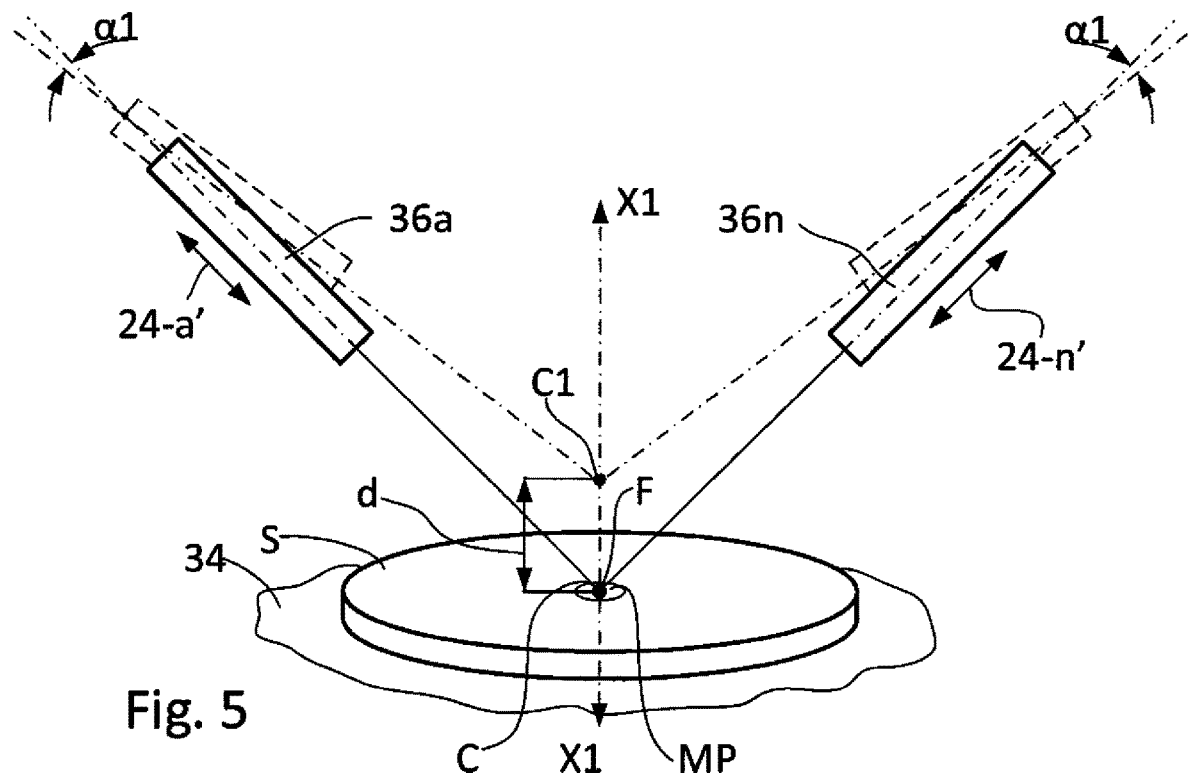
FIG. 5 illustrates a method according to one aspect of the invention, wherein the common focal point of the laser beams may assume different positions on a metal wire supplied by the metal material feed unit.
Figure 6:
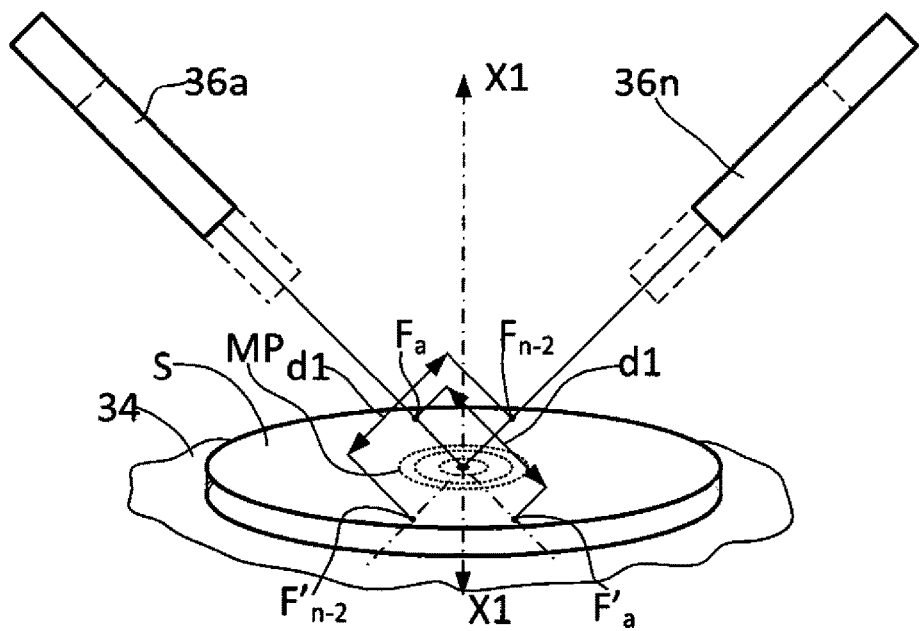
FIG. 6 illustrates a method according to another aspect of the invention, wherein, for controlling a shape and dimensions of the melt pool, the focal points of the laser beams are located at a distance from the longitudinal axis, in the direction of which the metal material is fed.

As shown in FIG. 1, which is a schematic general sectional view of an apparatus for the 2D printing method of the invention by fusing a metal material with control of a melt pool formed on a substrate, the apparatus (which in general is designated by reference numeral 20) contains a metal material feed unit 22 having a metal material feed longitudinal axis X1-X1 (hereinafter referred to as a longitudinal axis X1-X1 or merely as axis X1-X1) that coincides with a metal material feed direction aimed at a melt pool MP (FIGS. 5 and 6). The metal material feed unit 22 is shown and described in detail in our earlier U.S. patent application Ser. No. 16/739,874 filed on Jan. 10, 2020 under title "Apparatus and Method for 3D Laser Printing by Fusing Metal Wire Material", for which U.S. Pat. No. 11,654,512 was issued on May 5, 2023.

Figure 2:
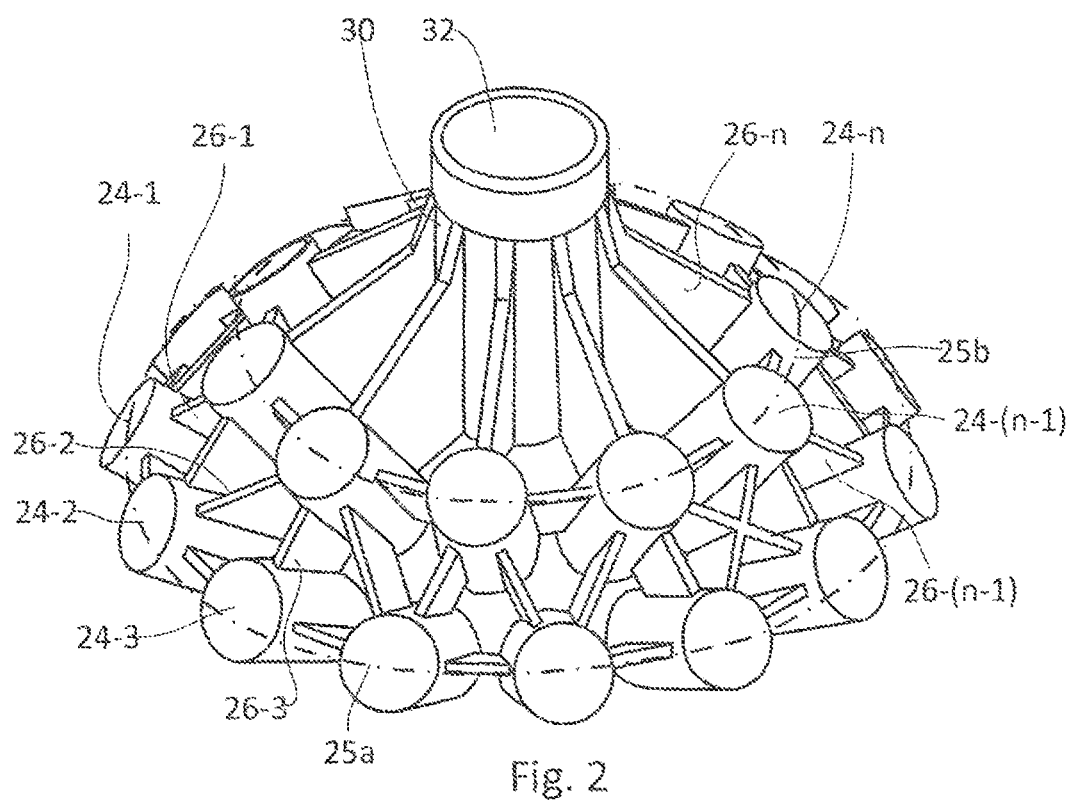
FIG. 2 is a three-dimensional view of an assembly of a plurality of identical laser sources, which, according to the method of the invention, are arranged symmetrically on the surface of an imaginary hemisphere.

The apparatus 20 also contains a plurality of laser sources 24-1, 24-2 . . . 24-(n-1), 24-n. Although four such laser sources are shown in the sectional view of FIG. 1, a plurality means two or more than four laser sources, and four of them are shown only as an example for simplicity of the drawings. In fact, as shown in FIG. 2, the laser sources 24-1, 24-2, 24-3 . . . 24-(n-1), 24-n have a three-dimensional distribution. In the example of FIG. 2, the laser sources are arranged uniformly and symmetrically on an imaginary hemispherical surface 26 (FIG. 1) and are installed on concentric circles 25a and 25b on the imaginary hemispherical surface 26. Concentric circles 25a and 25b are formed in a plane perpendicular to the longitudinal axis X1-X1 in the direction of which the metal material is fed. For simplification of the drawing, only two such circular groups of the laser sources are shown in FIG. 2. In other words, the laser sources 24-1, 24-2, 24-3 . . . which are formed on the concentric circle 25a belong to a first group G1, and the laser sources . . . 24-(n-1) and 24-n belong to a second group G2."

If necessary, several hemispherical shapes arranged one inside the other (not shown) can be used for combination of lasers with different focal lengths, e.g., 100 mm and 50 mm. For example, the 100 mm lasers may be positions "behind" the 50 mm lasers, and only the beams of 50 mm lasers may allow to pass through tiny openings. Such a multi-spherical arrangement is not shown for simplicity of the drawings.

The laser sources 24-1, 24-2, 24-3 . . . 24-(n-1), 24-n are held in an assembled state, e.g., by ribs 26-1, 26-2, 26-3 . . . 26-(n-1), 26-n, which are secured to form an integral structure connected, e.g., to a cylindrical body 30 having a central opening 32 for passing the metal material feed unit 22 (FIG. 1) oriented along the central opening 32.

Reference numeral 34 (FIG. 1) designates an object-formation table that supports a substrate S on which a 3D laser printing object of a predetermined shape is to be formed and which possesses at least three degrees of freedom for motions relative to the longitudinal axis X1-X1 of the material feed unit 22.

A construction of the object-formation table is beyond the scope of the present invention and may be represented by the end effector of an industrial robot arm having six-degrees of freedom, which is disclosed, e.g., in U.S. Pat. No. 8,243,730 issued on Aug. 14, 2012 to M. Nichols, et al. The end effector that holds a workpiece has drive mechanisms that provide the workpiece with at least five degrees of freedom such as linear motions in the directions of X, Y, Z axes and two turns at angles $\phi$ and $\theta$, as shown in FIG. 1. The end effector of the aforementioned patent provides such motions.

The metal material to be fused in the 3D laser printing process by the apparatus 20 is designated by letter M (FIG. 1) and is fed from the material supply unit 22 toward the substrate S in the direction of the axis X1-X1. The metal material M may be represented by a metal wire W or a thin stream of a metal powder P.

In case of a metal wire W, the structure of the material supply unit may be represented by the device disclosed in pending U.S. Pat. No. 11,654,512.

In case of a metal powder, the structure of the material supply unit may be represented by modifying the device disclosed in US Patent Application Publication 20140263195A1 (inventor: Q. Shuck, Published on Sep. 18, 2014) and entitled "Variable working distance for laser deposition". A modified device will differ from one shown in the aforementioned U.S. Pat. No. 11,654,512 in that the powder material feed unit will be arranged vertically in the direction of axis X1-X1 shown in FIG. 1. This is possible because the spatial arrangement of the laser sources 24-1, 24-2, 24-3 . . . 24-(n-1), 24-n provides the aforementioned opening 32 for passing the metal material feed unit 22.

Figure 3:
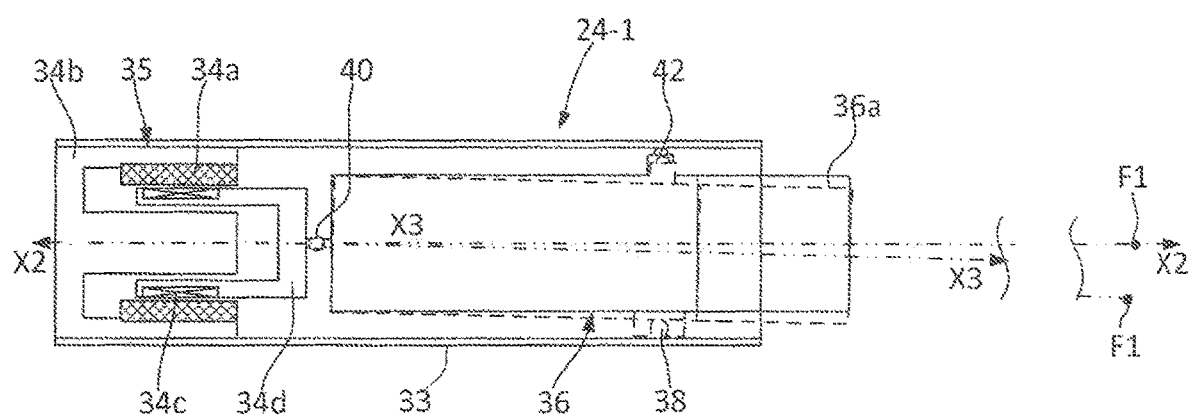
FIG. 3 is a longitudinal sectional view of one of the laser sources of FIG. 2.

Since all laser sources 24-1, 24-2, 24-3 . . . 24-(n-1), 24-n are identical, let us consider one of them, e.g., a laser source 24-1 shown in FIG. 3. The laser source 24-1 has a longitudinal housing 33, hereinafter called "a tubular housing since it has a tubular shape. The housing 33 has a longitudinal housing axis X2-X2 and contains a voice coil actuator 35. A voice coil actuator, also known as a DC linear actuator or a direct drive linear motor. It consists of a permanent magnetic field assembly in the form of a permanent magnet 34a with a ferrous steel member 34b and a coil assembly 34c. The current flowing through the coil assembly 34c interacts with the magnetic field generated by the permanent magnet member 34a and generates a force vector perpendicular to the direction of the current. The force vector can be reversed by changing the polarity of current flowing through the coil.

The coil 34c is secured in a cup-shaped cylindrical body 34d, which moves during the aforementioned interaction in the direction of a central axis X2-X2 of the laser source 24-1.

The laser source 24-1 also contains a laser 36, which has an optical axis X3-X3 and generates a laser beam B1 (FIG. 1) that propagates in the direction of the optical axis X3-X3 of the laser 36. The longitudinal axis X2-X2 of the laser source 24-1 and, hence, the optical axis X3-X3 of the laser 36 are tilted relative to the longitudinal axis X1-X1 of the material feed unit 22, and the laser 36 (as the lasers of all other laser sources 24-2, 24-3 . . . 24-(n-1), 24-n) are arranged so that their respective beams B2 . . . Bn, as well as the aforementioned laser beam B1, Intersect the longitudinal axis X1-X1 of the material feed unit 22. A focusing lens 36a is installed at the end of the laser 36 that faces the substrate S supported by the object-formation table 34 (FIG. 1).

The laser beam focusing lens 36a focuses the laser beam in a focal point (F1) (see FIG. 3) at a given distance from the lens. The focal point F1 is shown in two different positions because the laser 36 can move not only in the axis direction of the longitudinal housing axis X2-X2 but also tilt within the housing 33. This is achieved by providing the laser source not only with a mechanism for axial motions of the laser, i.e., with the voice coil actuator 35, but also with a mechanism 38 for tilting motions of the laser 36 relative to the longitudinal housing axis X2-X2. In order to provide the laser 36 with mobility in the axial direction and with tiltability relative to the axial direction, the laser 36 is linked to the cup-shaped cylindrical body 34d via an articulation device 40.

The articulation device 40 may be represented by a Hooke's joint or a cardan mechanism, and the mechanism 38 for tilting motions of the laser 36 may be represented by a piezo actuator. The piezo actuator can tilt the laser 36 to a position, in which the optical axis X3-X3 of the laser 36 forms an angle with respect to the longitudinal axis X2-X2 of the laser source 24-1.

Reference numeral 42 designates a mechanism for returning the laser 36 to the position, in which the axes X3-X3 and X2-X2 coincide. The returning mechanism 42 may be comprised of a spring-loaded ball, or the like.

Figure 4:
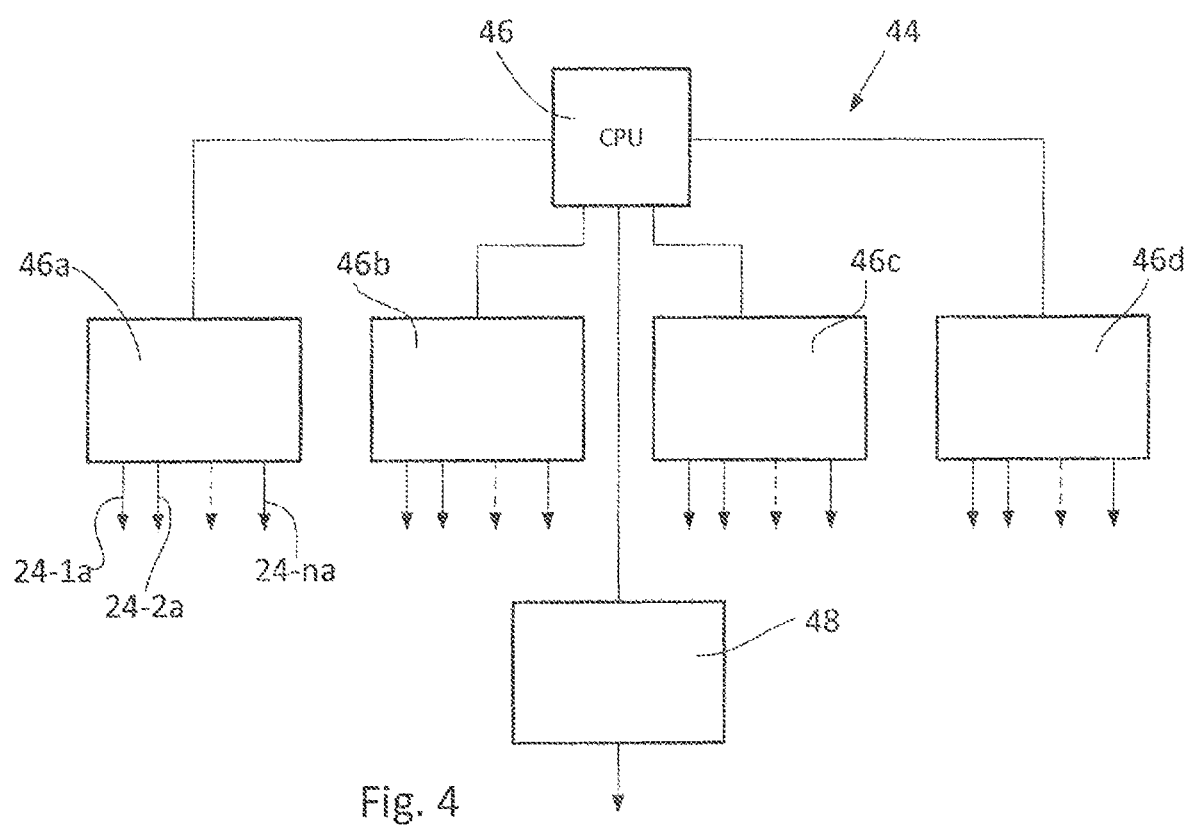
FIG. 4 is a simplified block diagram of a control system used in the apparatus for carrying out a method of the invention.

FIG. 4 is a simplified block diagram of a control system 44 of the apparatus 20 (FIG. 1) of the invention. The control system 44 contains a programmable device 46 such as a central processing unit (CPU) or a Graphics Processing Unit (GPU), which is electrically connected to four control units 46a, 46b, 46c, and 46d. Each control unit, in turn, is connected to each laser source (24-1, 24-2, 24-3 . . . 24-(n-1), 24-n). The laser sources are not shown in FIG. 4 but connection of the control units 46a, 46b, 46c, and 46d is designated by the respective arrows 24-1a, 24-2a . . . 24-na (for simplicity of the drawing, these connections are designated only on the control unit 46a). More specifically, the control unit 46a contains individual drivers (not shown) for each laser source 24-1, 24-2, 24-3 . . . 24-(n-1), 24-n for activation of the laser sources, and for adjusting their output light power. The control unit 46b is responsible for controlling thermoelectric cooling of the laser sources. The control unit 46c controls operations of the voice coil actuators 35 (FIG. 3). The control unit 46d controls operations of the piezo actuators 38.

As can be seen in FIG. 4, the CPU/GPU is also linked to the driver 48 of the object-formation table 34 (FIG. 1). Under commands of the CPU/GPU 46, the object-formation table 34 that possesses at least three degrees of freedom performs spatial motions according to a program preliminarily inputted into the CPU/GPU 46, thus making it possible to form three-dimensional articles of intricate profiles with high accuracy that in some cases may be unachievable or difficult to reach by conventional numeral controlled machine tools. Thus, the CPU 46 is connected through the respective control units 46a, 46b, 46c, and 436d individually to each laser source of 24-1, 24-2, 24-3 . . . 24-(n-1), 24-n of the plurality for controlling them individually or by dividing them into groups, such as the aforementioned groups G1 and G2 for moving their lasers, such as the laser 36 (FIG. 3), in the direction of the longitudinal housing axis X2-X2. The CPU/GPU is also connected to each device 38 for tilting the laser 36 relative to the longitudinal housing axis X2-X2.

As mentioned above, the present invention provides a method of 3D laser printing for fusing a metal material with a controllable melt pool. The method is carried out with the use of the apparatus 20 of the type described above, According to one aspect of the invention, the method includes the steps of placing on the object-formation table 34 a substrate S on which a 3D laser printing object of a predetermined shape is to be formed and feeding a metal material M (metal wire or metal powder (FIG. 1) from which the object of a predetermined shape is to be formed in the direction of an axis X1-X1 that passes through the center C of the hemispherical surface and that is perpendicular to the substrate. In the modification of FIG. 5, the common focal point F of the laser 36a and 36n is shifted up along the axis X1-X1 for a distance d from the center C on the surface of the substrate S to the point C1 on the same axis. This is achieved by tilting the lasers 36a of the respective laser sources (not shown in FIG. 5) by an angle α1.

FIG. 6 is a view similar to one shown in FIG. 5 but illustrating a process for adjusting the size and temperature of the melt pool MP. In other words, the temperature of the melt pool MP may be adjusted by positioning the focal points at different distances from the surface of the substrate. The temperature of the pool MP is increased by approaching the focal points Fa and Fn-2 to the surface of the substrate or decreased by moving the focal points Fa and Fn-2 away from the surface of the substrate.

Based on the generalized description of the method given above, a plurality of object formation processes is possible. For example, the material of the substrate S can be heated to a temperature close to the substrate material fusing point or melted to form a melt pool MP (FIGS. 5 and 6) into which a powder material P is poured from the material feeding unit 22. It is understood that the melt pool is formed by concentrating focuses of the laser beams in the center C of the hemisphere and thus melting a material of the substrate. By shifting the focal point F1 of each laser to a selected position on the optical axis, it is possible to control a size and temperature of the melt pool MP for optimization of the process.

When it is necessary, e.g., to preheat a metal wire, which is oriented in the direction of axis X1-X1 to a predetermined temperature in the point C1 above the center C, the lasers (such as the laser 36 of FIG. 3) of the respective laser sources 24-4 and 24-(n-2) are tilted inside the tubular housing 33 (FIG. 3) and at the same time the focal points F1 of the laser beams of the respective lasers 36 are shifted in the direction of the axis X3-X3 so that the common focal point of the laser beams assume position C1 shown in FIG. 5. In other words, by selectively shifting the focal point of the laser beams and tilting the optical axes of the lasers, it becomes possible to concentrate focal points of the laser beams on the metal material or on the substrate. In FIG. 5 the second position of the laser sources and their beams are shown by broken lines. Double-headed arrows 24-a' and 24-n' show axial displacements of the lasers 36a and 36n, respectively. Angle α1 shows angular displacements of the lasers 36a and 36n (which are similar to the laser 36 shown in FIG. 3) relative to the axes of their tubular housings (similar to the axis X2-X2 and the housing 33 shown in FIG. 3).

If necessary, by placing the focal points of the laser beams on the metal material, e.g., the wire material W, it is possible not to fuse the material but rather preheat it to a hot-bending state so that the material can be maintained in a flowable state that allows deposition thereof on a previously laid layer and thus to form a layer-by-layer structure. The point of intersection of the beams may be in the position C1 or in the point C (FIG. 5) on the surface of the substrate.

Figure 7:
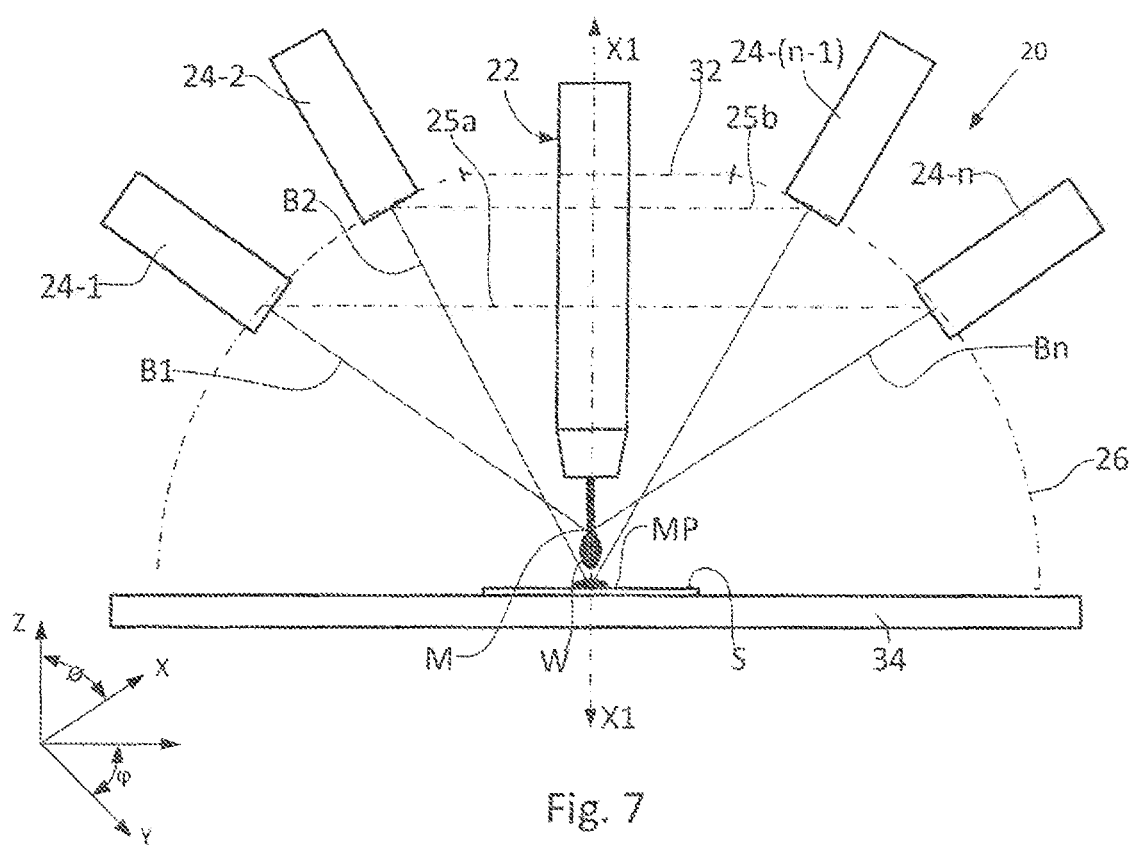
FIG. 7 is a view which is similar to FIG. 1, except that a wire metal material is used instead of the powder metal material.

FIG. 7 is a view similar to FIG. 1, except that a wire metal material W is used instead of the powder metal material P.

Although the apparatus and method of the invention were described with reference to specific modifications, it is understood that the invention is not limited to these modifications and any changes are possible without deviations from the scope of the attached patent claims. For example, hemiellipsoidal surface of rotation can be used for arrangement of the laser sources instead of a hemispherical surface. The laser sources can be divided into more than two groups and may form groups by selecting them from circles of different diameters on the hemispherical surface. Mechanisms other than a voice coil actuator and a piezo electric actuator can be used for shifting the lasers axially and angularly. A programmable device other than CPU or GPU may be used for individually controlling operations of the system units. Thus, by selectively using laser sources individually or in groups, it is possible to place focal points of the laser beams at any point on the metal material, the substrate, or in a space for forming a 3D product and/or controlling the melt pool. The individual laser sources or the groups can be used simultaneously or at any time sequence. The laser sources may be identical or different in light power. The size and temperature of the melt pool can be controlled by adjusting the output light power of the laser sources.

The invention claimed is:

1. A method for 3D laser printing by heating/fusing a metal material with controllable melt pool comprising:
providing an apparatus for 3D laser printing for fusing a metal material in a melting point of the metal material with control of a melt pool formed on a substrate, the apparatus comprising: a material feeder configured to feed a metal material toward a substrate; a plurality of laser sources, each laser source having a laser with an optical axis and generating a laser beam, which propagates in the direction of the optical axis of the laser and is tilted relative to a longitudinal axis corresponding to a direction along which the metal material is fed towards the substrate, the lasers being arranged symmetrically on at least one imaginary hemispherical surface having a center, which lies on the longitudinal axis, the laser beams intersecting the longitudinal axis and focusing in a selected point on the longitudinal axis, wherein each laser source comprises: a longitudinal housing having a longitudinal housing axis and containing the laser having the optical axis aligned with the longitudinal housing axis; the longitudinal housing containing: means for reciprocation motions of the laser in the direction of the longitudinal housing axis; means for tilting motions of the laser relative to the longitudinal housing axis; and means for linking the laser with the means for reciprocation motions of the laser and allowing the laser to move in the direction of the longitudinal housing axis and to tilt the laser relative to the longitudinal housing axis; and a laser beam focusing lens that focuses the laser beam in a focal point at a given distance from the focusing lens; and an object-formation table that supports the substrate on which an object of a predetermined shape is formed by a 3D printing process and which possesses at least three degrees of freedom for motions relative to the longitudinal axis and optical axes of the laser beams;
feeding the metal material from which the object of a predetermined shape is to be made in the direction of the longitudinal axis, the longitudinal axis being perpendicular to the substrate;
generating a plurality of laser beams by lasers which are arranged symmetrically on the at least one hemispherical surface and focusing the laser beams in the selected point;
treating the metal material, when the metal material passes through the selected point, by fusing or heating the metal material at the selected point depending on whether the metal material is a powder material or a wire material; and
imparting to the object the predetermined shape by spatially moving the object-formation table in a space relative to the hemispherical surface.

2. The method for 3D laser printing by heating/fusing a metal material according to claim 1, wherein the step of treating the metal material comprises:
placing the selected position point on a surface of the substrate; and
forming a melt pool by concentrating focuses of the laser beams in the selected point on the substrate thus melting a material of the substrate.

3. The method for 3D laser printing by heating/fusing a metal material according to claim 2, further comprising a step of controlling a size and temperature of the melt pool by shifting the focal point of each laser beam along the optical axis relative to the substrate.

4. The method for 3D laser printing by heating/fusing a metal material according to claim 3, wherein the means for reciprocation motions of the laser is a voice coil and the means for tilting motions of the laser is a piezo actuator.

5. The method for 3D laser printing by heating/fusing a metal material according to claim 2, wherein the means for reciprocation motions of the laser is a voice coil and the means for tilting motions of the laser is a piezo actuator.

6. The method for 3D laser printing by heating/fusing a metal material according to claim 1, further comprising a step of controlling a size and temperature of the melt pool by shifting the focal point of each laser beam along the optical axis relative to the substrate.

7. The method for 3D laser printing by heating/fusing a metal material according to claim 1, wherein the means for reciprocation motions of the laser is a voice coil and the means for tilting motions of the laser is a piezo actuator.

* * * * *